US008905655B1

United States Patent
Hsu et al.

(10) Patent No.: US 8,905,655 B1
(45) Date of Patent: Dec. 9, 2014

(54) SHIELD MODULE TRAVEL ENLARGING STRUCTURE

(71) Applicant: First Dome Corporation, New Taipei (TW)

(72) Inventors: An Szu Hsu, New Taipei (TW); Way Han Dai, New Taipei (TW); Hsiu Fan Ho, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 13/924,744

(22) Filed: Jun. 24, 2013

(51) Int. Cl.
    *G03B 17/00* (2006.01)
    *G03B 11/04* (2006.01)

(52) U.S. Cl.
    CPC .................. *G03B 11/043* (2013.01)
    USPC ........................................ 396/448

(58) Field of Classification Search
    USPC .......... 396/429, 448; 348/373, 374; 359/511; 455/575.1, 575.4; 379/433.11–433.12
    See application file for complete search history.

(56) References Cited

U.S. PATENT DOCUMENTS

| 8,256,906 B2 * | 9/2012 | Kao et al. ....................... 359/511 |
| 2007/0274709 A1 * | 11/2007 | Ho ................................. 396/448 |

* cited by examiner

*Primary Examiner* — Clayton E Laballe
*Assistant Examiner* — Minh Phan
(74) *Attorney, Agent, or Firm* — Rosenberg, Klein & Lee

(57) ABSTRACT

A shield module travel enlarging structure includes a front cover and a rear cover formed with opposite windows. The front and rear covers are assembled to form a module main body having an internal operation space. A shield is mounted in the operation space and movable between a position in alignment with the opposite windows and a position misaligned from the opposite windows. A transmission gear is mounted in the internal operation space of the module main body to cooperate with the shield. The transmission gear at least has a large-gear-ratio gear and a small-gear-ratio gear. The large-gear-ratio gear is drivingly engaged with the shield. A push member is drivingly engaged with the small-gear-ratio gear. When the push member is moved, via the transmission gear, the shield is slid by an enlarged travel.

10 Claims, 5 Drawing Sheets

SHIELD MODULE TRAVEL ENLARGING STRUCTURE

BACKGROUND OF THE INVENTION

1. Field of the Invention

The present invention relates to a shield module travel enlarging structure, which is applicable to a protection shield module for the lens of a portable electronic device. By means of the shield module travel enlarging structure, when a push member is pushed by a relatively short distance, the shield is slid by an enlarged sliding travel.

2. Description of the Related Art

Currently, the tablet or intelligent mobile phone is generally designed with picture-taking and filming functions. The tablet or intelligent mobile phone is equipped with a camera lens for taking pictures and filming.

The lens is generally exposed to the ambient environment and is subject to contamination of external alien particles such as dust. This will affect the picture-taking quality. In order to avoid the contamination of the lens, a shield module having a slidable shield is generally provided to shield the lens when not used. In use, the shield can be easily opened to perform the picture-taking operation. After the operation is completed, the shield can be easily closed to protect the lens.

The current shield module generally includes a slide rail-type shield. An external pushbutton is provided for a user to push the shield from outer side. The pushbutton is generally fixedly connected with the shield. That is, the shield will move as far as the push member moves. That is, the push distance of the pushbutton of such shield module is always equal to the sliding travel of the shield.

Under the structural design requirements or configuration design requirements of the novel products in the market, it often takes place that the push distance of the push member cannot be increased, while the sliding travel of the shield must be elongated or even in a limited space, the push distance must be shortened, while the sliding travel of the shield must be elongated. The conventional shield module can hardly satisfy these requirements.

SUMMARY OF THE INVENTION

It is therefore a primary object of the present invention to provide a shield module travel enlarging structure. By means of the shield module travel enlarging structure, when a push member is pushed by a relatively short distance, the shield is moved by an enlarged travel.

It is a further object of the present invention to provide the above shield module travel enlarging structure. In the case that the push distance of the push member cannot be increased, by means of the shield module travel enlarging structure, the moving travel of the shield can be still increased.

It is still a further object of the present invention to provide the above shield module travel enlarging structure. In the case that the push distance of the push member must be shortened, the moving travel of the shield can be still increased.

To achieve the above and other objects, the shield module travel enlarging structure of the present invention includes a front cover and a rear cover formed with opposite windows. The front and rear covers are assembled to form a module main body having an internal operation space. A shield is mounted in the operation space and movable between a position in alignment with the opposite windows and a position misaligned from the opposite windows. A transmission gear is mounted in the internal operation space of the module main body to cooperate with the shield. A push member is disposed on a rear surface of the rear cover. The transmission gear at least has a large-gear-ratio gear and a small-gear-ratio gear. The large-gear-ratio gear is drivingly engaged with the shield. The small-gear-ratio gear is drivingly engaged with the push member. When the push member is moved, via the transmission gear, the shield is slid by an enlarged travel.

In the above shield module travel enlarging structure, the front cover is formed with a front window and the rear cover is formed with a rear window corresponding to the front window of the front cover. Two raised sections with a specific height are disposed on two sides of the front cover. The rear cover is formed with a height in adaptation to the height of the raised sections, whereby after the front cover is fitted with the rear cover, the front window and the rear window are aligned with each other as the opposite windows and the internal operation space is defined between the front cover and the rear cover. The shield is slidable within the internal operation space to block or unblock the opposite windows.

In the above shield module travel enlarging structure, the rear cover is further formed with a perforation beside the rear window. Two frame rails are disposed on two sides of the perforation. A rack is disposed on a surface of the shield. The large-gear-ratio gear of the transmission gear is drivingly engaged with the rack of the shield. The small-gear-ratio gear outward protrudes from a surface of the rear cover through the perforation, which surface faces the push member. The push member is movably mounted between the frame rails of the rear cover. The push member has a shift end for a user to push. A short rack is disposed on a surface of the push member for drivingly engaging with the small-gear-ratio gear.

In the above shield module travel enlarging structure, more than one elastic member is disposed between opposite surfaces of the push member and the rear cover. The elastic member serves to quickly push the shield to a fully opened position or a fully closed position. Accordingly, the operation of the shield module is facilitated.

In the above shield module travel enlarging structure, when the shield is positioned in the fully opened position and the fully closed position, the elastic member is obliquely positioned between the push member and the rear cover with two ends respectively located on the opposite surfaces of the push member and the rear cover.

The present invention can be best understood through the following description and accompanying drawings, wherein:

DETAILED DESCRIPTION OF THE PREFERRED EMBODIMENTS

Figure 1:
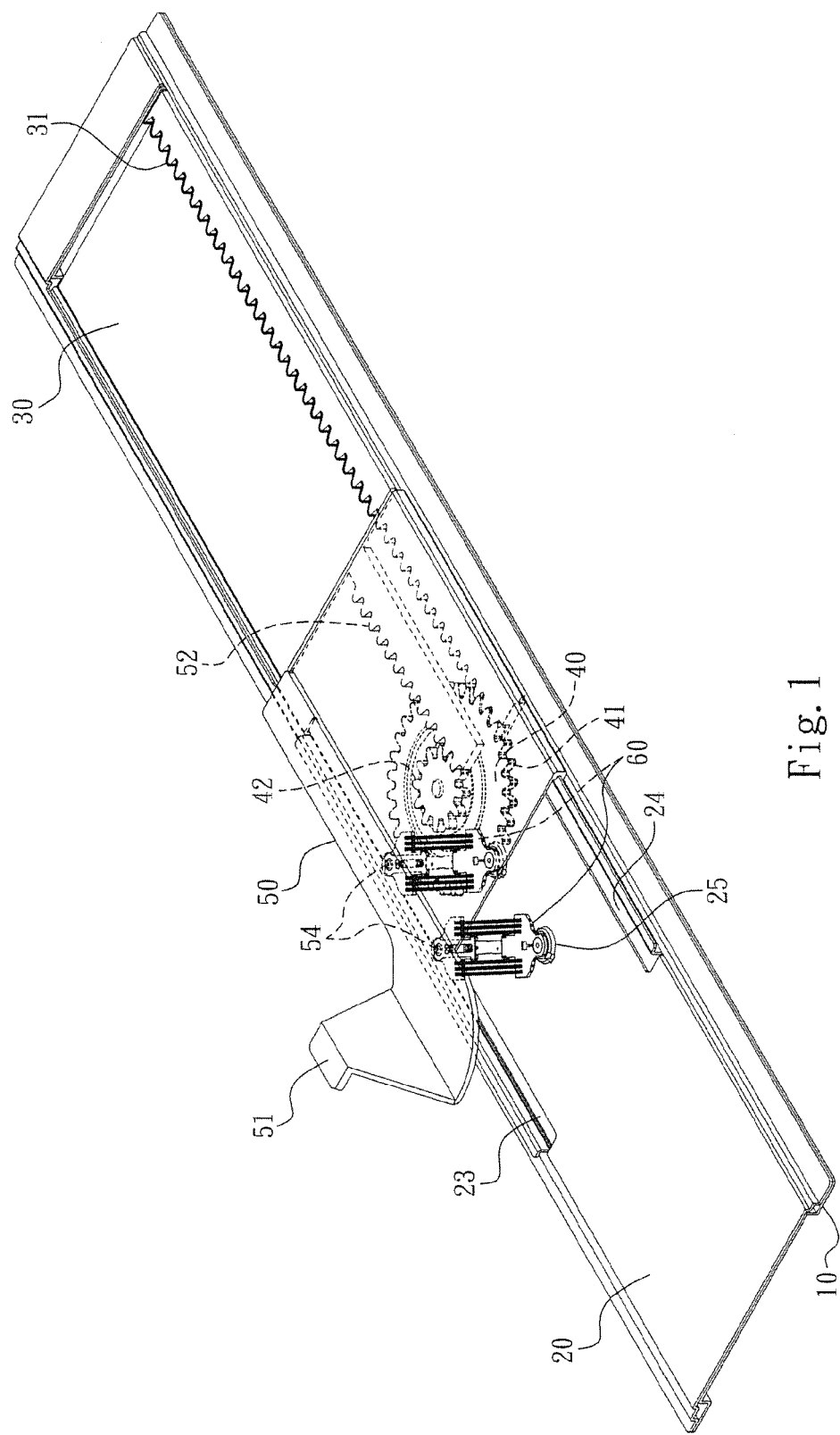
FIG. 1 is a perspective assembled view of a preferred embodiment of the present invention.
Figure 2:
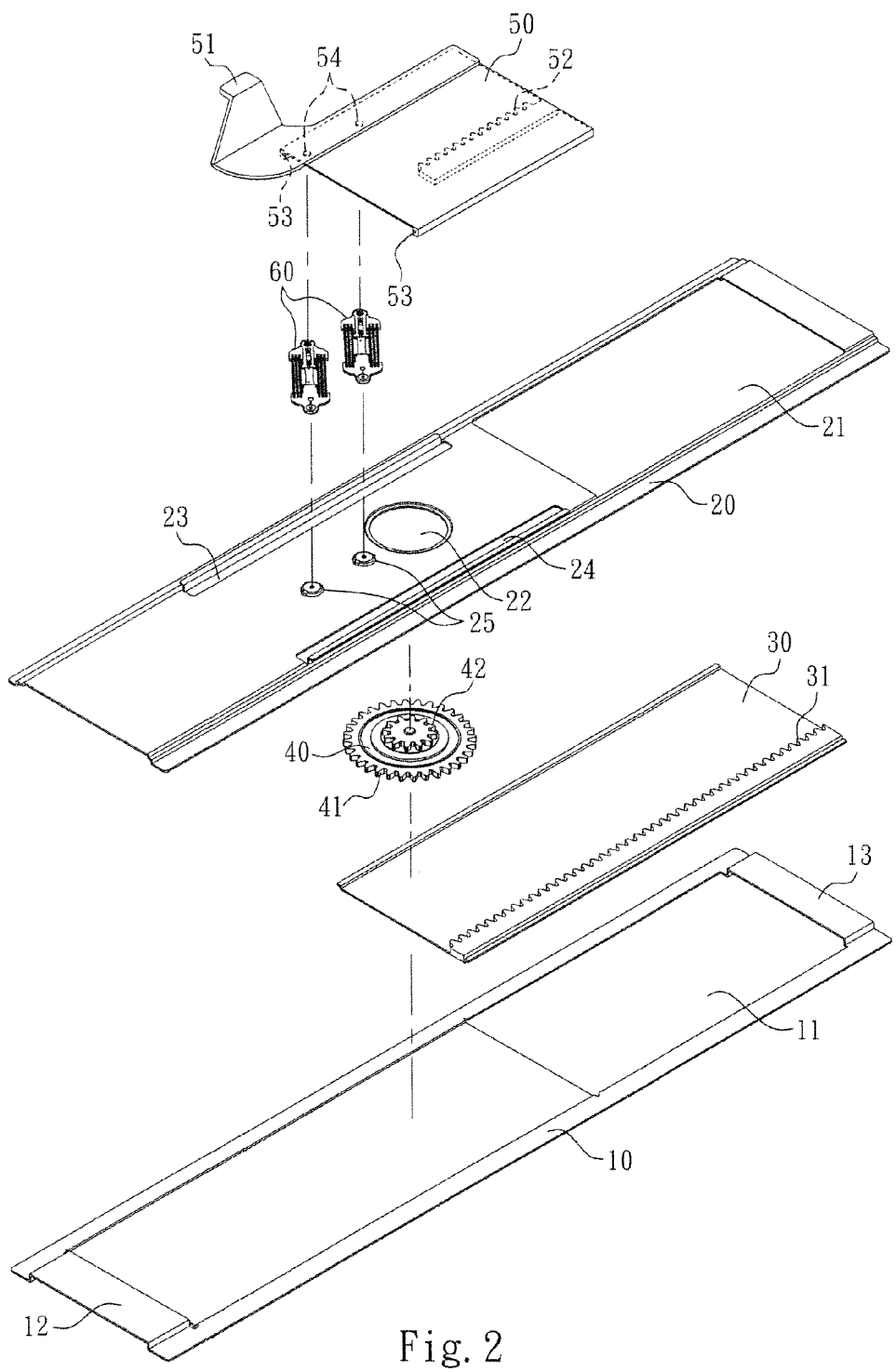
FIG. 2 is a perspective exploded view of the preferred embodiment of the present invention.

Please refer to FIGS. 1 and 2. According to a preferred embodiment, the present invention includes a front cover 10, a rear cover 20 assembled on a rear side of the front cover 10 to together form a module main body having an internal operation space, a shield 30 cooperating with a transmission gear 40 and movably mounted between the front cover 10 and the rear cover 20, and a push member 50 disposed on a rear surface of the rear cover 20. The push member cooperates with elastic members 60 to facilitate the opening/closing operation of the module.

The front cover 10 is formed with a front window 11 with a specific area. Two raised sections 12, 13 with a specific height are disposed on two sides of the front cover 10. The rear cover 20 is formed with a rear window 21 corresponding to the front window 11 of the front cover 10. The rear cover 20 is formed with a height in adaptation to the height of the raised sections 12, 13, whereby after the front cover 10 is fitted with the rear cover 20, the front window 11 and the rear window 21 are aligned with each other and the internal operation space is defined between the front cover 10 and the rear cover 20. The rear cover 20 is further formed with a perforation 22 beside the rear window 21. Two frame rails 23, 24 are disposed on two sides of the perforation 22 and extend along the moving direction of the shield 30. In this embodiment, locating bosses 25 are disposed on the rear surface of the rear cover 20 for locating one end of the elastic members 60.

The shield 30 is slidably mounted in the internal operation space defined between the front cover 10 and the rear cover 20. A rack 31 is disposed on a surface of the shield 30. The transmission gear 40 at least has a large-gear-ratio gear 41 and a small-gear-ratio gear 42. The large-gear-ratio gear 41 is drivingly engaged with the rack 31 of the shield 30. The small-gear-ratio gear 42 outward protrudes from the surface of the rear cover 20 through the perforation 22.

Two lateral rails 53 are disposed on two sides of the push member 50 corresponding to the frame rails 23, 24. The lateral rails 53 are movably assembled with the two opposite frame rails 23, 24 of the rear cover 20. The push member 50 has a shift end 51 for a user to force. A short rack 52 is disposed on a surface of the push member 50 for drivingly engaging with the small-gear-ratio gear 42, which outward protrudes from the surface of the rear cover 20 through the perforation 22. In addition, locating bosses 54 are disposed on a surface of the push member 50, which surface faces the rear cover 20. The locating bosses 54 serve to locate the other end of the elastic members 60.

In this embodiment, the locating bosses 25 are such disposed on the rear surface of the rear cover 20 that when the shield 30 is totally closed or totally opened, the elastic members 60, (which are push-type elastic members in the drawings), are obliquely positioned with one end located on the push member 50, while the other end located on the rear cover 20.

Figure 3:
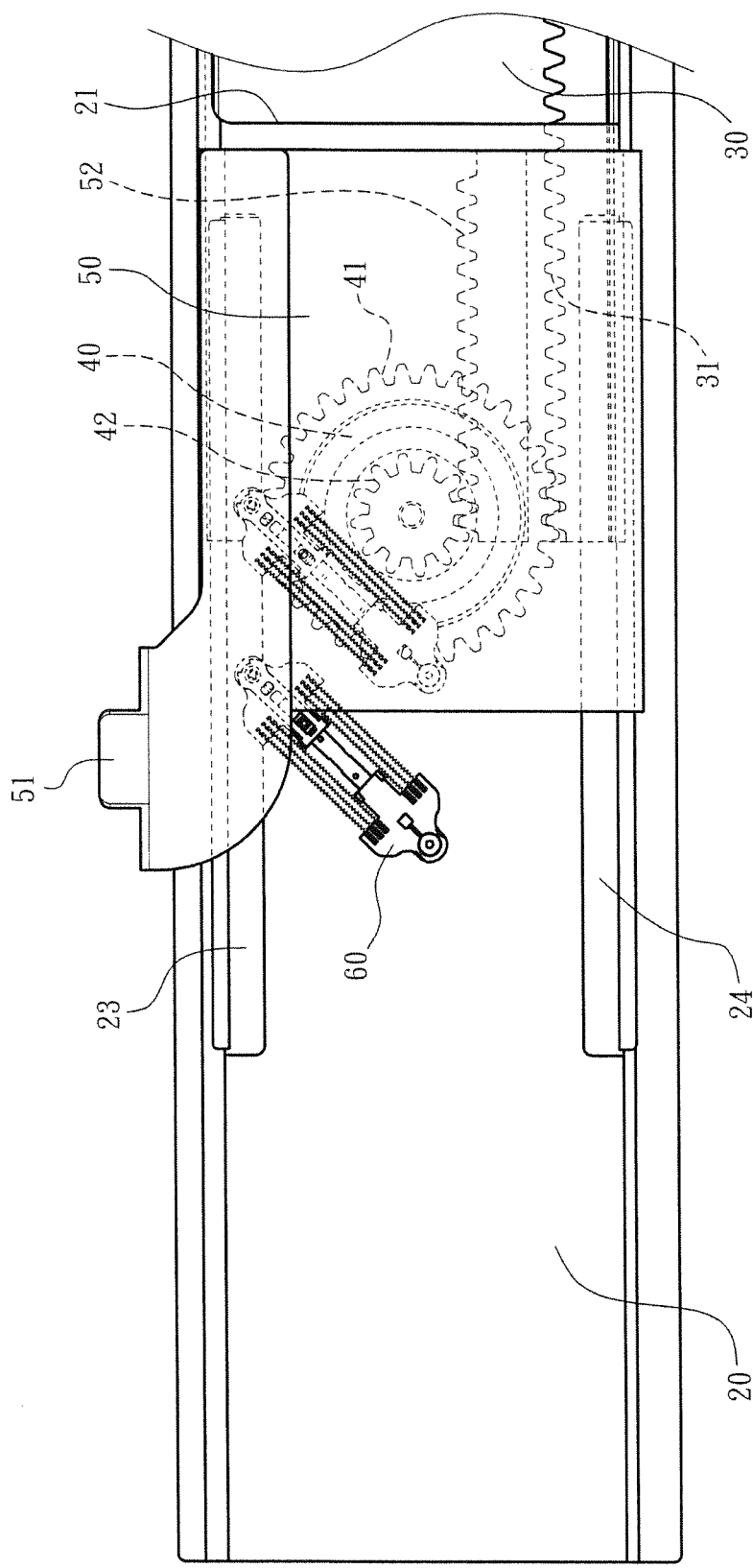
FIG. 3 is a front view of the preferred embodiment of the present invention, in which the shield is in a closed state.
Figure 4:
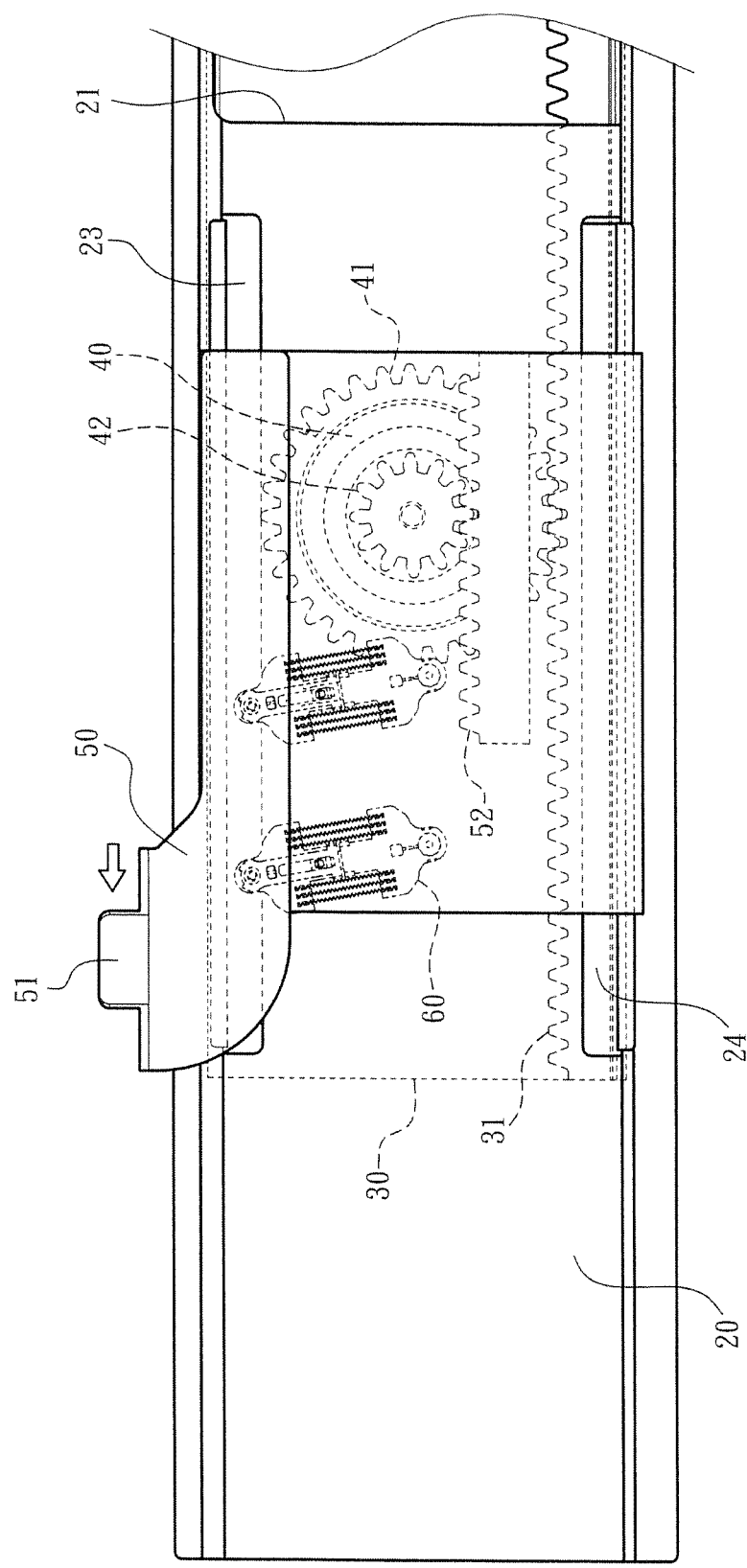
FIG. 4 is a front view according to FIG. 3, showing that the shield is half-opened.
Figure 5:
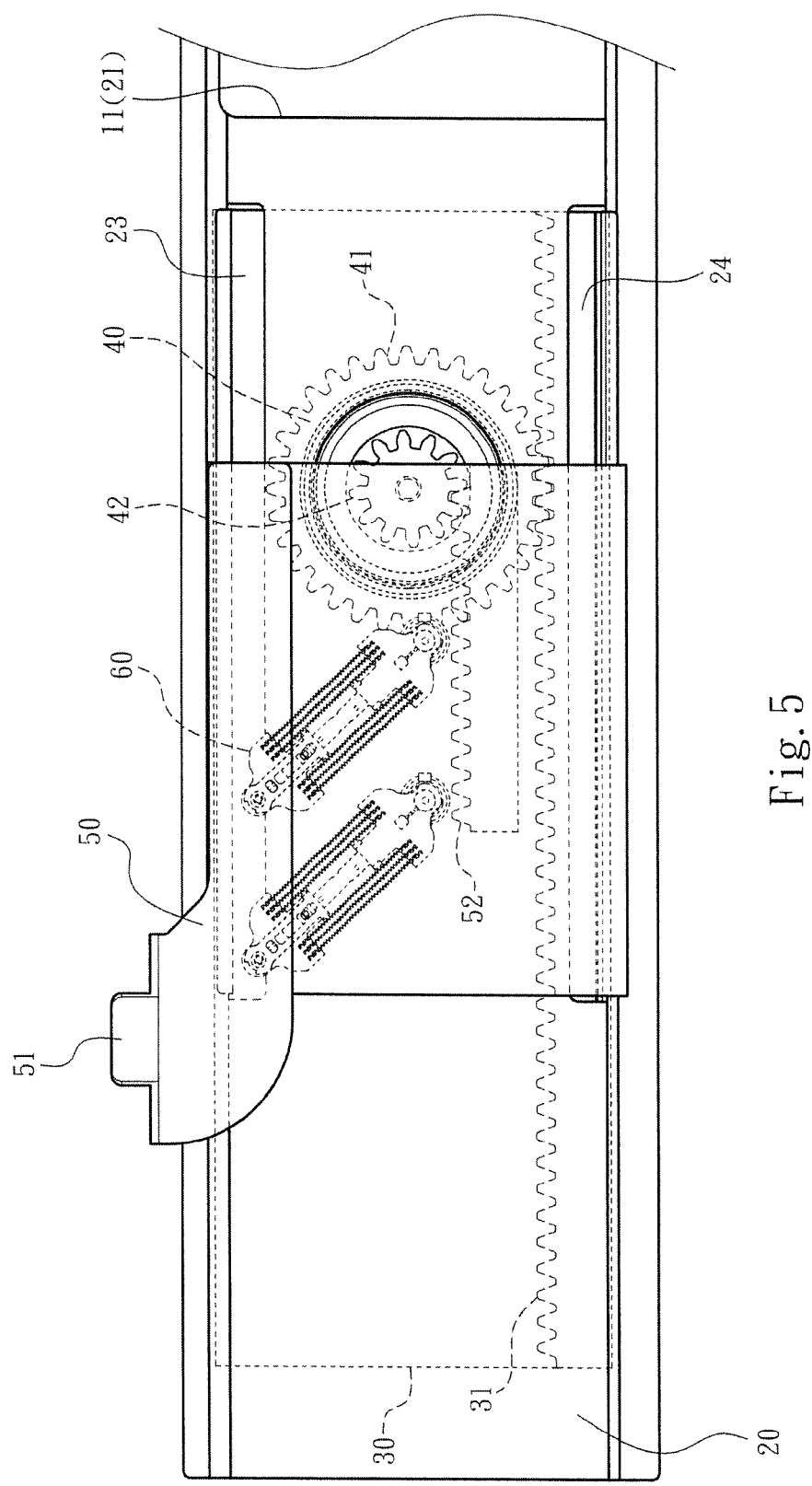
FIG. 5 is a front view according to FIG. 4, in which the shield is in an opened state.

FIG. 3 shows that the shield 30 is positioned between the front window 11 of the front cover 10 and the rear window 21 of the rear cover 20 to block the same in a protection state. As shown in FIG. 4, when a force is applied to the shift end 51 to push the push member 50 in a direction of the arrow, the short rack 52 of the push member 50 drives the small-gear-ratio gear 42 to rotate. At this time, the entire transmission gear 40 starts to rotate and the large-gear-ratio gear 41 is synchronously rotated. Simultaneously, the shield 30 engaged with the large-gear-ratio gear 41 is moved leftward according to the drawing. When the shield 30 reaches the position as shown in FIG. 5, the shield 30 is fully opened to unblock the front window 11 of the front cover 10 and the rear window 21 of the rear cover 20, whereby the shielded unit (such as a lens) is exposed to outer side. Reversely, when a force is applied to the shift end 51 of the push member 50 to push the push member 50 in a reverse direction, the shield 30 is restored to a closed state.

In this embodiment, the elastic members 60 are normally obliquely mounted between the push member 50 and the rear cover 20. During the opening/closing process of the shield 30, the elastic members 60 (such as compression springs) will be first compressed. After the shield 30 moves to a certain position, where the elastic members are compressed to a maximum extent, due to the elastic members' own elasticity, the elastic members will immediately restore to their home state to quickly push the shield to another expected position, (that is, the fully opened or fully closed position). Accordingly, the operation of the shield module is facilitated.

During the opening/closing process of the shield, the push member 50 is pushed to first drive the small-gear-ratio gear 42. Then the large-gear-ratio gear 41 drives the shield 30. Therefore, when the push member 50 is pushed by a shorter distance, the shield 30 is slid by a larger travel. In the case that the push distance of the push member cannot be increased, while the sliding travel of the shield must be elongated, the present invention is applicable to enlarge the sliding travel of the shield. Alternatively, in the case that in a limited space, the push distance must be shortened, while the sliding travel of the shield must be elongated, the present invention is applicable to enlarge the sliding travel of the shield.

The above embodiments are only used to illustrate the present invention, not intended to limit the scope thereof. Many modifications of the above embodiments can be made without departing from the spirit of the present invention.

What is claimed is:

1. A shield module travel enlarging structure comprising a front cover, a rear cover and a shield, the front and rear covers being assembled to form a module main body having opposite windows and an internal operation space, the shield being mounted in the operation space and movable between a position in alignment with the opposite windows and a position misaligned from the opposite windows, the shield module travel enlarging structure further comprising a transmission gear mounted in the module main body to cooperate with the shield, the transmission gear at least having a large-gear-ratio gear and a small-gear-ratio gear, the large-gear-ratio gear being drivingly engaged with the shield, the shield module travel enlarging structure further comprising a push member disposed on a rear surface of the rear cover, the small-gear-ratio gear being drivingly engaged with the push member;

wherein the front cover is formed with a front window and the rear cover is formed with a rear window corresponding to the front window of the front cover, two raised sections with a specific height being disposed on two sides of the front cover, the rear cover being formed with a height in adaptation to the height of the raised sections, whereby after the front cover is fitted with the rear cover, the front window and the rear window are aligned with each other as the opposite windows and the internal operation space is defined between the front cover and the rear cover; and the rear cover is further formed with a perforation, two frame rails being disposed on two sides of the perforation and extending along a moving direction of the shield, a rack being disposed on a surface of the shield, the large-gear-ratio gear of the transmission gear being drivingly engaged with the rack of the shield, the small-gear-ratio gear outward protruding from a surface of the rear cover through the perforation, which surface faces the push member, two lateral rails being disposed on two sides of the push member corresponding to the frame rails, the lateral rails being movably assembled with the two opposite frame rails, a short rack being disposed on a surface of the push member for drivingly engaging with the small-gear-ratio gear.

2. The shield module travel enlarging structure as claimed in claim 1, wherein the push member has a shift end.

3. The shield module travel enlarging structure as claimed in claim 2, wherein at least two elastic members are disposed between opposite surfaces of the push member and the rear cover.

4. The shield module travel enlarging structure as claimed in claim 3, wherein when the shield is positioned in the position totally in alignment with the opposite windows and when the shield is positioned in the position totally misaligned from the opposite windows, the elastic members are obliquely located between the opposite surfaces of the push member and the rear cover.

5. The shield module travel enlarging structure as claimed in claim 3, wherein the elastic members are a push-type elastic member.

6. The shield module travel enlarging structure as claimed in claim 4, wherein the elastic members are a push-type elastic member.

7. The shield module travel enlarging structure as claimed in claim 1, wherein at least two elastic members are disposed between opposite surfaces of the push member and the rear cover.

8. The shield module travel enlarging structure as claimed in claim 7, wherein when the shield is positioned in the position totally in alignment with the opposite windows and when the shield is positioned in the position totally misaligned from the opposite windows, the elastic members are obliquely located between the opposite surfaces of the push member and the rear cover.

9. The shield module travel enlarging structure as claimed in claim 7, wherein the elastic members are a push-type elastic member.

10. The shield module travel enlarging structure as claimed in claim 8, wherein the elastic members are a push-type elastic member.

* * * * *